(12) United States Patent
Hurt

(10) Patent No.: US 7,093,667 B2
(45) Date of Patent: *Aug. 22, 2006

(54) ERGONOMIC HAND TOOL

(75) Inventor: Daniel P. Hurt, Spring Park, MN (US)

(73) Assignee: Legacy Holdings, Inc., Watertown, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/129,992

(22) Filed: May 16, 2005

(65) Prior Publication Data

US 2005/0241838 A1 Nov. 3, 2005

Related U.S. Application Data

(63) Continuation-in-part of application No. 10/786,767, filed on Feb. 25, 2004.

(51) Int. Cl.
*A01B 1/00* (2006.01)

(52) U.S. Cl. ............... 172/381; 403/375; 403/388; 403/400; D8/10; D8/107; D8/301; D8/303

(58) Field of Classification Search .............. D08/1, D08/6, 7, 10–14, 105–107, 300–303, 315–325, D08/336–344, 367–372, 394–396; 403/384–400, 403/375, 380, 326, 341, 335, 336, 373–376; 172/371–381

See application file for complete search history.

(56) References Cited

U.S. PATENT DOCUMENTS

| 309,437 | A | 12/1884 | Calef |
|---|---|---|---|
| 576,234 | A | 1/1897 | Hagaman et al. |
| 712,843 | A | 11/1902 | Paul |
| 2,180,544 | A | 1/1939 | Nissen |
| 2,482,589 | A | 9/1949 | Maguire |
| 2,710,571 | A | 6/1955 | Pfister |
| 3,232,355 | A | 2/1966 | Woolworth |
| 4,477,114 | A | 10/1984 | Callis |
| 4,644,740 | A | 2/1987 | Lee |
| 4,822,087 | A | 4/1989 | DeCarlo |
| 4,888,846 | A | 12/1989 | Natale |
| 5,014,792 | A | 5/1991 | Gierloff |
| 5,133,101 | A | 7/1992 | Hauser et al. |
| 5,177,941 | A | 1/1993 | Tharp et al. |
| D352,872 | S | 11/1994 | Crocket |
| 5,529,357 | A | 6/1996 | Hoffman |
| 5,813,206 | A | 9/1998 | McKittrick |
| 5,937,627 | A | 8/1999 | McKittrick |

FOREIGN PATENT DOCUMENTS

| GB | 2183433 | 6/1987 |
|---|---|---|
| GB | 2248034 | 3/1992 |

*Primary Examiner*—Christopher J. Novosad
(74) *Attorney, Agent, or Firm*—Haugen Law Firm PLLP

(57) ABSTRACT

An ergonomic hand tool for enhancing the leverage available to a user includes a frame having a distal portion and a proximal portion, and a working element operably coupled to a distal end of the distal portion. The frame further includes a handle that is pivotally coupled to the frame at a portion thereof intermediate the proximal portion and the distal portion. A brace structure is preferably operably coupled to the proximal portion of the frame, with the brace structure being configured to operably brace against an upper side of a user's forearm while the user operably grasps the handle.

10 Claims, 3 Drawing Sheets

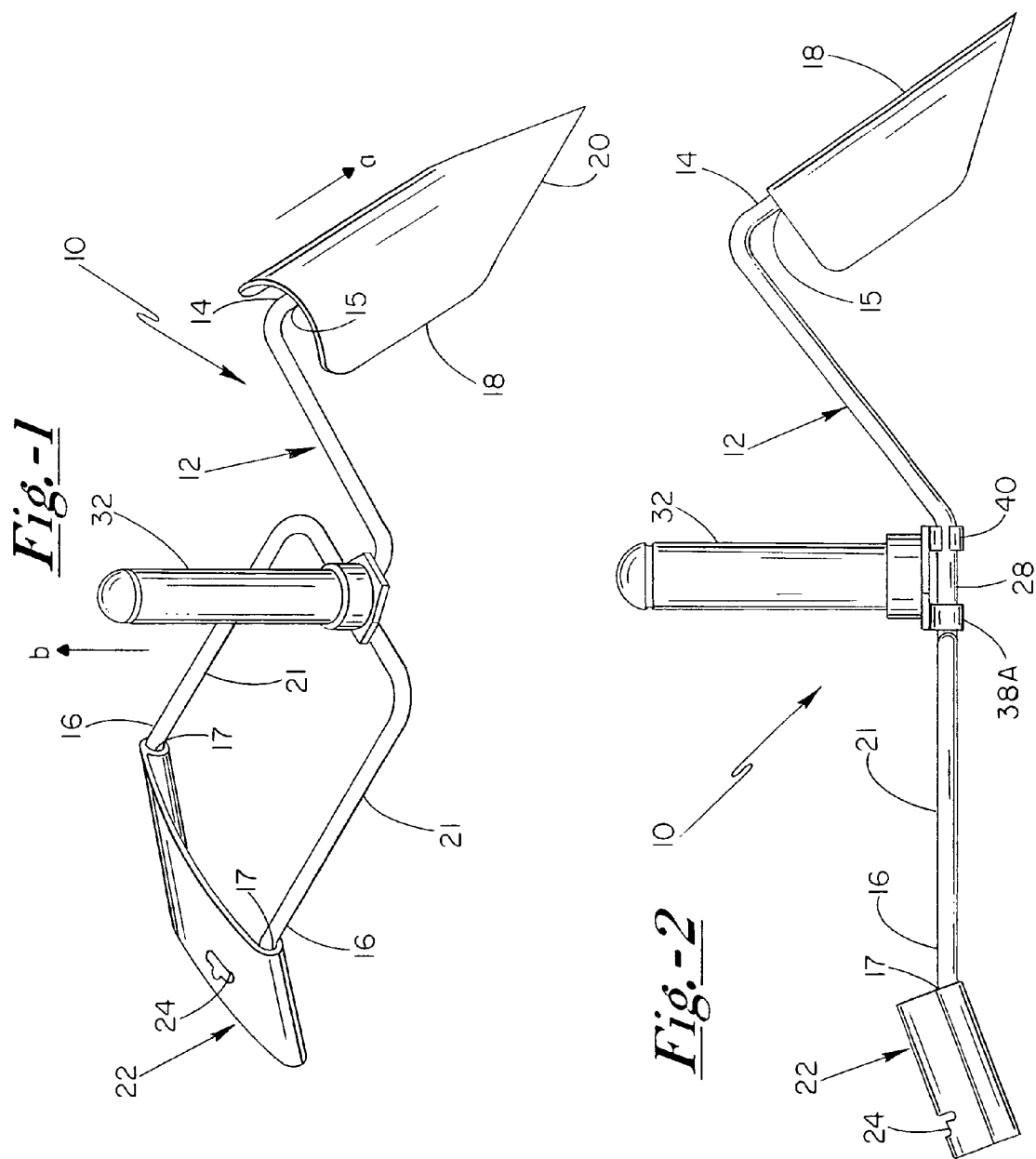

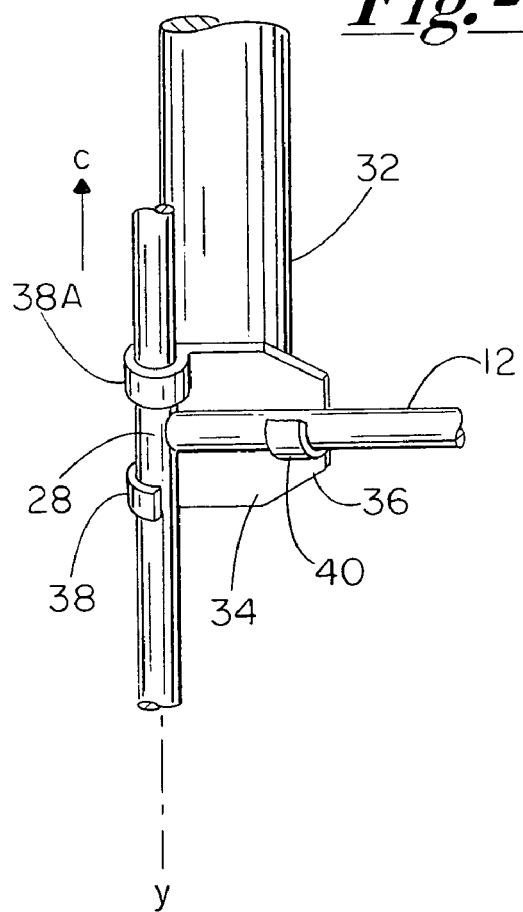
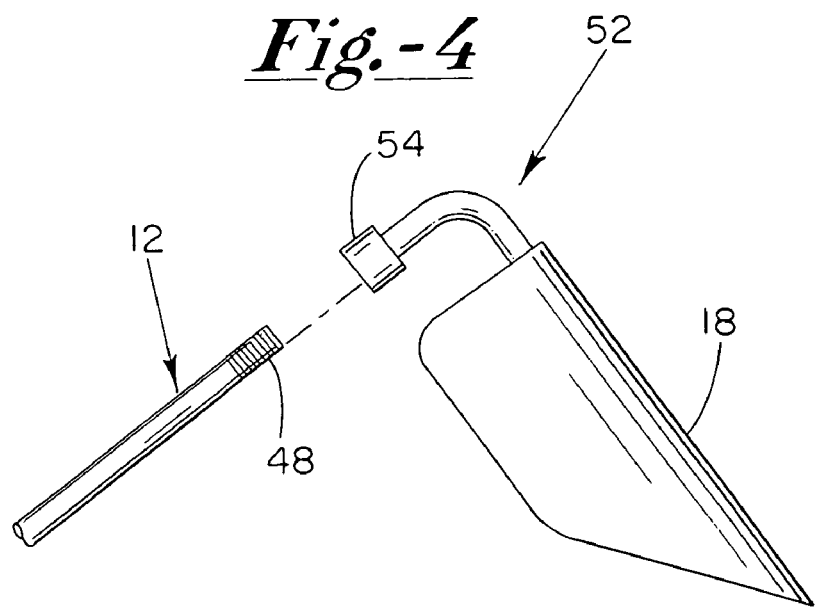

ERGONOMIC HAND TOOL

CROSS-REFERENCE TO RELATED APPLICATIONS

This application is a continuation-in-part of co-pending U.S. patent application Ser. No. 10/786,767, filed on Feb. 25, 2004, and entitled "ERGONOMIC HAND TOOL", the content of which is incorporated herein in its entirety.

FIELD OF THE INVENTION

The present invention relates to hand tools generally, a more particularly to a hand tool having an ergonomic design that increases the fulcrum length achieved when utilized by a user in comparison to conventional hand tools. The ergonomic hand tool of the present invention correspondingly minimizes stress placed upon the user's wrist during operation of the tool.

BACKGROUND OF THE INVENTION

Hand tools, such as those commonly utilized in garden or yard applications, have been embodied in a wide variety of configurations. Typically, however, such hand tools comprise a frame having a working element disposed at one end of the frame and a handle disposed at the opposite end of the frame. Through such a configuration, a significant portion of the resistive forces encountered in the operation of the hand tool are focused at the user's wrist. Therefore, a relatively large amount of force must be applied at the user's wrist in order to properly operate the hand tool. The application of such forces at the user's wrist can result in early fatigue, soreness, and even medical problems, such as carpal tunnel syndrome.

Recent hand tool designs have attempted to address the problems stated above by incorporating a handle that is disposed intermediate a working element end of the associated frame and an opposite, proximal, end of the frame, with the proximal end of the frame being adapted to be operably placed about the forearm of the user while the user grasps the intermediately-disposed handle. In such a manner, operating forces focused at the user's wrist are substantially eliminated, with such forces being redirected to the user's elbow. However, since the length of the fulcrum developed in such modified tools is the distance from the user's elbow to the working element, as compared to being from the user's wrist to the working element of the tool, the magnitude of leverage available to the user is greatly enhanced. The increase in leverage achieved in the modified intermediate-handle designs correspondingly substantially reduces the magnitude of resistive forces placed upon the user's elbow. As a result, fatigue, soreness, and medical problems associated with operating hand tools is substantially diminished.

Examples of hand tools incorporating such a modified design are illustrated in U.S. Pat. Nos. 5,813,206 and 5,937,627 issued to Janie McKitrick. While the devices described in the above-cited patents provide useful operational characteristics, the fixed nature of the intermediate handle of such devices renders the tools somewhat difficult to store, display, and ship. In addition, the fixed handle configurations described in the cited patents do not provide for a convenient means of replacing the handle with a customized and/or replacement handle.

It is therefore a principle object of the present invention to provide a hand tool incorporating an intermediately-disposed handle that is pivotally coupled to the frame of the hand tool.

It is another object of the present invention to provide a hand tool having an intermediately-disposed handle that is pivotally and removably secured to the frame of the tool.

It is a still further object of the present invention to provide a hand tool with an intermediately-disposed handle element that is convenient to store and to display upon retail shelves.

SUMMARY OF THE INVENTION

By means of the present invention, an ergonomic hand tool is provided which incorporates a frame having a working element on a first end thereof, a brace disposed at a second opposed end thereof, and a handle disposed at a portion of the frame intermediate the working element and the brace. The handle is preferably pivotally secured to the tool frame so as to have the capability of pivoting into an orientation substantially parallel to the tool frame. Such a pivoting characteristic of the handle provides for more efficient storage and marketing of the hand tool on retail store shelves, as well as for more efficient shipping of the product in a nested configuration.

The handle preferably further detachably locks into place about the tool frame in an orientation convenient for grasping by the user during use of the tool. In some embodiments, the relative orientation of the detachably-locked handle is in a direction substantially opposite to the relative orientation of the working element of the hand tool.

In a particular embodiment of the invention, the hand tool includes a frame having a distal portion and a proximal portion with the proximal portion having at least one proximal end. The frame further includes a working element operably coupled to a distal end of the distal portion, with the working element having a working portion that is oriented along a first direction with respect to the frame. The hand tool also preferably includes a handle pivotally coupled to the frame at a portion thereof that is intermediate the proximal end and the distal end, with the pivotal coupling being enabled by a coupling apparatus having first and second distinct coupling bodies that are detachably engageable with one another at the intermediate portion of the frame. The tool also incorporates a brace structure operably coupled to the proximal end of the frame, the brace structure being configured to operably brace against an upper side of a user's forearm while the user grasps the handle.

BRIEF DESCRIPTION OF THE DRAWINGS

FIG. 1 is a perspective view of a hand tool of the present invention;

FIG. 2 is a side elevational view of the hand tool illustrated in FIG. 1;

FIG. 3 is a bottom perspective view of a portion of the hand tool illustrated in FIGS. 1 and 2;

FIG. 4 is a partial side view of a hand tool of the present invention;

DETAILED DESCRIPTION OF THE PREFERRED EMBODIMENTS

Figure 5A:
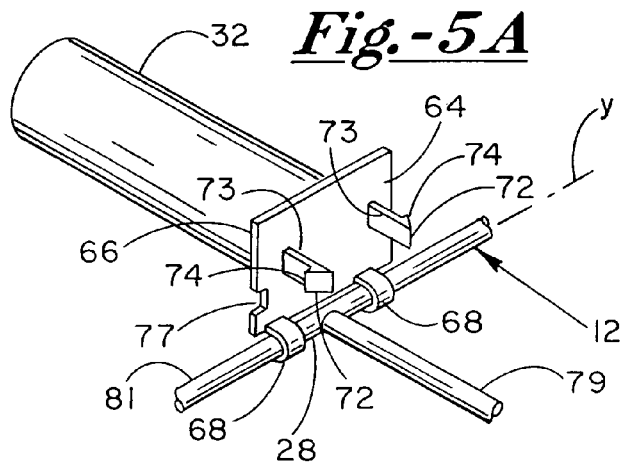
FIG. 5A is a perspective isolation view of a portion of a handle coupling apparatus of the present invention.
Figure 5B:
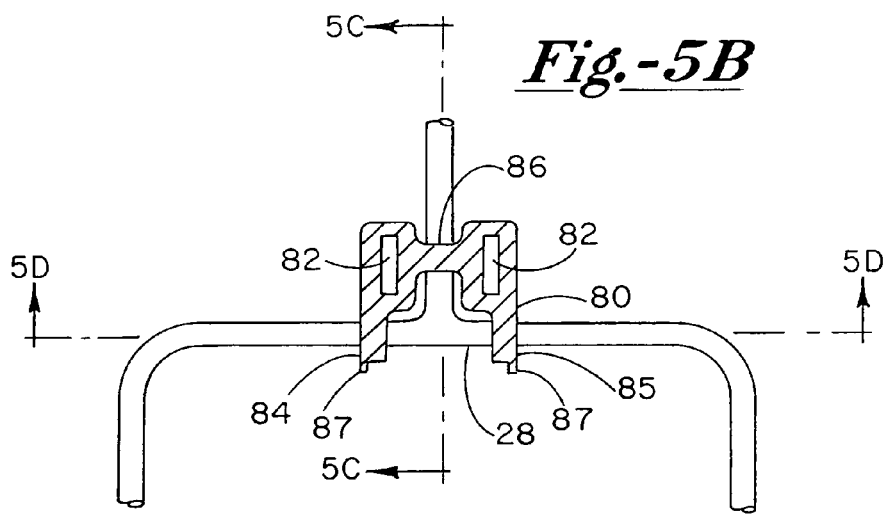
FIG. 5B is a top isolation view of a portion of a handle coupling apparatus of the present invention.

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

With reference to the enclosed drawing figures, and first to FIG. 1, a hand tool 10 of the present invention is illustrated incorporating a frame 12 having a distal portion 14 and a proximal portion 16. Hand tool 10 further includes a working element 18 that is operably coupled to distal end 15 of distal portion 14. Working element 18 preferably includes a working portion 20 that is oriented along a first direction "a" with respect to frame 12.

Working element 18 is illustrated in FIG. 1 as being a shovel or trowel element. The present invention, however, contemplates the use of a variety of configurations for working element 18. Examples of such alternative working elements include, for example, rakes, claws, spades, and the like. Working element 18 may be connected to distal end 15 of frame 12 through fixed attachment means such as welding, soldering, fasteners, and the like. In other embodiments, however, and as described hereinbelow, working element 18 may be removably attached to distal end 15 of frame 12.

In preferred embodiments of the invention, working portion 20 of working element 18 is oriented along direction "a", with such working portions encompassing the respective portions of working elements 18 that are utilized to engage the earth or other targeted body.

Hand tool 10 preferably further includes a brace structure 22 that is operably coupled to proximal end 17 of frame 12. In the embodiment illustrated in FIG. 1, proximal portion 16 of frame 12 diverges from intermediate portion 28 of frame 12 into two spaced apart and substantially parallelly disposed proximal members 21. In this embodiment, brace structure 22 extends between, and is operably coupled to respective proximal ends 17 of proximal members 21. In other embodiments of the present invention, however, proximal portion 16 of frame 12 may comprise a single proximal member, with brace structure 22 having first and second ends connected to one another at proximal end 17 so as to form a loop that is anchored to frame 12. Further configurations for brace structure 22 are also contemplated by the present invention.

Brace structure 22 is preferably fabricated from a resilient or elastic material which deforms a certain degree under stress. Such a resilient characteristic for brace structure 22 is incorporated in the present invention for comfort purposes to the user, particularly in that resistive forces generated in the operation of hand tool 10 tend to force brace structure 22 down upon the forearm of the user. With brace structure 22 being fabricated of a relatively soft resilient material such as a synthetic rubber material, the user is spared from encountering a rigid structure bearing against their upper forearm.

As a further feature of the present invention, an aperture 24 is provided in brace structure 22 so that hand tool 10 may be conveniently suspended from a substantially horizontally disposed protrusion such as a nail, shelving pin, or the like. Aperture 24 accordingly accommodates a substantially vertical storage and display orientation for hand tool 10, which vertical orientation is most desired in the marketing industry.

As shown in FIG. 1, hand tool 10 further includes a handle 32 that is pivotally coupled to frame 12 at intermediate portion 28 thereof. Handle 32 is illustrated in FIGS. 1 and 2 in a detachably locked orientation with respect to frame 12. In this embodiment, handle 32 is detachably fixed in an orientation along a second direction "b" with respect to frame 12 that is substantially opposed to first direction "a". The respective orientations of handle 32 and working element 18 illustrated in FIGS. 1 and 2 represent a preferred mode of the invention, and which provides a desired degree of leverage for the user in operating hand tool 10 while grasping handle 32.

As best illustrated in FIG. 3, handle 32 preferably includes a coupling body 34 connected to an end of handle 32 adjacent frame 12. Coupling body 34 enables the pivoting and locking engagement of handle 32 to intermediate portion 28 of frame 12. In a preferred embodiment, coupling body 34 includes a base 36 having one or more pivoting engagement receptacles 38 and one or more locking engagement receptacles 40 depending from base 36. The orientation illustrated in FIG. 3 shows handle 32 in a detachably locked position along direction "b", specifically in that locking engagement receptacle 40 is operably engaged about frame 12. Such an engagement prevents handle 32 from pivoting about an axis "y" of frame 12.

In order to enable handle 32 to be pivoted about axis "y", the combination of handle 32 and coupling body 34 is displaced along frame 12 in a direction defined by direction "c" to thereby disengage locking engagement receptacle 40 from frame 12. Once locking engagement receptacle 40 has been disengaged from frame 12, handle 32 may freely pivot about axis "y" of frame 12, with pivoting engagement receptacles 38 retainably grasping coupling body 34 to frame 12. In such a manner, handle 32 may be selectively pivoted about axis "y" into an orientation substantially parallel to proximal portion 16 of frame 12 to thereby form a more compact overall structure to hand tool 10.

The particular configuration for coupling body 34 described with reference to FIG. 3 is preferred for its ease of manufacture and assembly onto frame 12 as a separate and distinct element from frame 12. In assembly, the combination of handle 32 and coupling body 34 is threaded onto frame 12, which may preferably be rod stock or the like, via a fully closed pivoting engagement receptacle 38, identified in FIG. 3 as 38A. Coupling body 34 is correspondingly threaded to a desired location on frame 12, and preferably at intermediate portion 28 thereof. Once in such a desired position on frame 12, coupling body 34 may be selectively engaged and disengaged therewith as desired by the user to effect a desired orientation of handle 32 with respect to frame 12.

Coupling body 34 is preferably fabricated from a polymeric material that exhibits a degree of resiliency so that at least locking engagement receptacles 40 resiliently engage frame 12. In some embodiments of the present invention, none of the pivoting engagement receptacles 38 are fully closed, as is shown with reference to pivoting engagement receptacle 38A.

Though the present description describes a particular embodiment for coupling body 34, a wide variety of pivoting mechanisms coupled to handle 32 are contemplated by the present invention. Namely, handle 32 may be configured to pivot in any desired direction about frame 12 so as to enable a storage, shipping, or display orientation for handle 32 that is substantially parallel to proximal portion 16 of frame 12. Additionally, coupling body 34 may be configured to allow a readily removable attachment mechanism for handle 32, so that handle 32 may be selectively coupled to and decoupled from frame 12. Applicant therefore acknowledges that alternative configurations of pivoting mechanisms may be incorporated with handle 32 of the present invention while still being within the scope of the invention presently contemplated.

A particular example of an alternative orientation for handle 32 is in embodiments where handle 32 extends from frame 12 in a direction substantially opposite to direction "b". So long as handle 32 provides a location at which the user may firmly grasp and manipulate hand tool 10 with a pivoting mechanism applied to handle 32 about frame 12, the present invention contemplates such a configuration.

A further example of an alternative pivoting mechanism embodiment for handle 32 is illustrated in FIGS. 5A–5D, wherein first coupling body 64 is connected to an end of handle 32 adjacent frame 12. Preferably, first coupling body 64 includes a base 66 having one or more pivoting engagement receptacles 68 depending therefrom. Pivoting engagement receptacles 68 are preferably configured to extend about at least a portion of transverse frame member 81 at intermediate portion 28 of frame 12 in order to pivot about axis "y" defined by transverse frame member 81.

Coupling body 64 preferably further includes one or more locking appendages 72 depending from base 66 in a direction substantially opposite that of elongated handle 32. Locking appendages 72 preferably include respective leg portions 73 and tab portions 74 for operably and lockingly engaging with one or more correspondingly-configured apertures 82 in second coupling body 80 to thereby detachably lock handle 32 in a position aligned substantially along direction "B", as shown in FIG. 1.

Figure 5C:
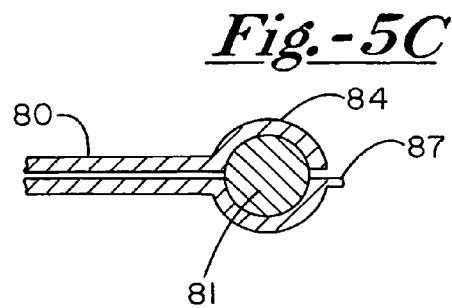
FIG. 5C is a cross-sectional view of a portion of the apparatus illustrated in FIG. 5B, as taken along cut-line 5C.
Figure 5D:
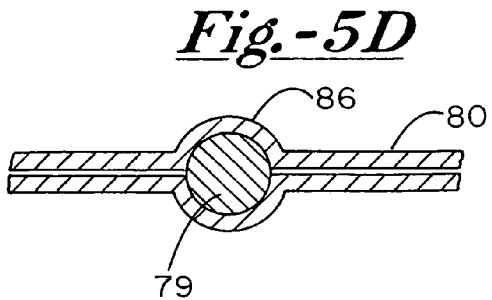
FIG. 5D is a cross-sectional view of a portion of the apparatus illustrated in FIG. 5B, as taken along cut-line 5D.

Second coupling body 80 is preferably a distinct unit that is attachable to intermediate portion 28 of frame 12. As best illustrated in FIGS. 5C and 5D, second coupling body 80 is preferably made up of two components that are configured to be coupled together about respective portions of frame 12. In particular, second coupling body 80 preferably includes first and second coupling members 84, 85 that are configured to operably engage about transverse frame member 81, and a third coupling member 86 that is configured to operably mount about longitudinal frame member 79 of frame 12. The two distinct parts of second coupling body 80 are preferably engaged with one another about frame 12 through suitable affixation mechanism, such as fasteners, adhesives, and the like. In a particularly preferred embodiment, the two components of second coupling body 80 are preferably removably engaged with one another about frame 12, such as through the utilization of removable fasteners or the like. In all such embodiments, however, second coupling body 80 is mounted about frame 12 so as to provide a stable base to which first coupling body 64 may operably and removably connect.

As described above, first coupling body 64 is preferably configured to selectively engage with second coupling body 80 so as to detachably secure handle 32 in an orientation aligned substantially along direction "b". Specifically, locking appendages 72 preferably detachably engage within respective apertures 82 of second coupling body 80 when handle 32 is pivoted about axis "y" to an upright position along direction "b". Tab portions 74 of respective locking appendages 72 act to operably restrain first coupling body 64 from inadvertently disengaging from second coupling body 80 by engaging with a lower surface of second coupling body 80 adjacent to respective apertures 82. Such a restraint from disengagement, however, may be overcome by the user through the application of a concerted force of relatively small degree upon handle 32 to rotate handle 32 about axis "y" away from second coupling body 80.

A further aspect of the relationship between first and second coupling bodies 64, 80 is in the provision of a secondary lock mechanism for operably and detachably locking handle 32 in a prone position substantially perpendicular to direction "b". Such a secondary locking mechanism is enabled through the operable mating engagement of one or more protrusions 87 extending outwardly from first and/or second coupling members 84, 85 with correspondingly-configured notches 77 in base 66. In particular, handle 32 may be releasably held in a predetermined pivot position about axis "y" through the operable mating engagement of protrusions 87 and notches 77. Due to the somewhat resilient nature of the materials forming first and second coupling bodies 64, 80, such locking engagement between protrusions 87 and notches 77 may be overcome by a relatively small concerted pivoting force applied to handle 32 about axis "y".

As stated above with respect to coupling body 34, each of coupling bodies 64, 80 are preferably fabricated from a polymeric material that exhibits a degree of resiliency so that at least locking appendages 72 and protrusions 87 resiliently engage respective apertures 82 and notches 77.

Handle 32 may be fabricated from a variety of appropriate materials. A particularly preferred material for use in the fabrication of handle 32 is a somewhat resilient polymeric material such as a synthetic rubber.

Frame 12 preferably is manufactured from a relatively strong and durable material such as nickel steel, stainless steel, galvanized steel, chrome-plated steel, and the like. A preferred form for frame 12 is conventional rod stock that is bent into the desired configurations of frame 12.

In a further embodiment of the present invention, removably attached working elements 52 may be provided for use in combination with frame 12 of the present invention. As illustrated in FIG. 4, a distal portion of frame 12 may be configured to removably receive working elements 52 thereto. Though a variety of configurations for the removable engagement between working elements 52 and frame 12 are possible and are contemplated in the present invention, a particular example for such a coupling arrangement may include a threaded portion 48 of frame 12 which threadably receives a nut 54 that is operably coupled to working element 52. In such a manner, a desired working element 52 may be selectively attached and detached to hand tool 10 of the present invention, so that a desired operation may be performed by the user through the utilization of hand tool 10.

As described above, handle 32 incorporates a pivoting and locking mechanism for a number of reasons. For example, such a mechanism enables the efficient storage and packing of hand tool 10 in shipping and other applications. In addition, pivoting handle 32 enables the efficient display of a plurality of hand tools 10 in a vertically-oriented back-to-back relationship on a display shelf. The pivoting handle 32 allows a more compact volume of space to be consumed by hand tool 10 when the handle 32 is in an orientation substantially parallel to proximal portion 16 of frame 12.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A hand tool comprising:
   (a) a frame having a distal portion and a proximal portion, said proximal portion having at least one proximal end;
   (b) a working element operably coupled to a distal end of said distal portion, said working element having a working portion that is oriented along a first direction with respect to said frame;
   (c) a handle means pivotally coupled to said frame at a portion thereof intermediate said proximal end and said distal end, said handle means including a coupling apparatus for pivoting and detachably locking engagement with said intermediate portion of said frame, said coupling apparatus having first and second distinct coupling bodies that are detachably engageable with one another, said first coupling body including one or more engagement receptacles pivotally engaging said frame, and said second coupling body including a plurality of engagement members operably engaging said frame; and
   (d) a brace means operably coupled to said proximal end of said frame, said brace means being configured to operably brace against an upper side of a user's forearm while the user operably grasps said handle means.

2. A hand tool as in claim 1, including one or more locking appendages extending from at least one of said first and second coupling bodies, said one or more locking appendages being releasably engageable with respective apertures in the other of said first and second coupling bodies.

3. A hand tool as in claim 2 wherein said one or more locking appendages extend from said first coupling body.

4. A hand tool as in claim 1 wherein said coupling apparatus is configured to lockingly engage said handle in a detachably fixed orientation along a second direction with respect to said frame, which second direction is substantially opposed to said first direction.

5. A hand tool as in claim 1 wherein said second coupling body is fixedly secured to said frame.

6. A hand tool as in claim 1 wherein said proximal portion of said frame diverges from said intermediate portion into two spaced apart and substantially parallelly disposed proximal members.

7. A hand tool as in claim 6 wherein said brace means extends between said proximal members.

8. A hand tool as in claim 1 wherein said brace means is fabricated from a resilient material.

9. A hand tool as in claim 1 wherein said working element is removably secured to said frame.

10. A hand tool as in claim 1 wherein said handle means is removably securable to said frame.

* * * * *